(12) United States Patent
Thompson

(10) Patent No.: US 11,293,285 B2
(45) Date of Patent: Apr. 5, 2022

(54) SEALING SYSTEM

(71) Applicant: THE SECRETARY OF STATE FOR DEFENCE, Salisbury (GB)

(72) Inventor: Duncan Godfrey Mervyn Thompson, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 411 days.

(21) Appl. No.: 16/341,170

(22) PCT Filed: Oct. 18, 2017

(86) PCT No.: PCT/GB2017/000153
§ 371 (c)(1),
(2) Date: Apr. 11, 2019

(87) PCT Pub. No.: WO2018/073555
PCT Pub. Date: Apr. 26, 2018

(65) Prior Publication Data
US 2020/0208520 A1    Jul. 2, 2020

(30) Foreign Application Priority Data
Oct. 18, 2016   (GB) ..................................... 1617611

(51) Int. Cl.
*E21F 17/107*    (2006.01)
*B64F 5/40*      (2017.01)
(Continued)

(52) U.S. Cl.
CPC ............ *E21F 17/107* (2013.01); *B63B 81/00* (2020.01); *B64F 5/40* (2017.01); *E21F 1/10* (2013.01); *E21F 1/14* (2013.01); *F16L 55/1141* (2013.01)

(58) Field of Classification Search
CPC ...... E06B 7/2318; E06B 9/00; F16L 55/1141; E21F 17/107
See application file for complete search history.

(56) References Cited

U.S. PATENT DOCUMENTS 3,994,103 A * 11/1976 Ouellet ................ B65G 69/008
                                                52/2.13
4,023,372 A *  5/1977 Presler ................. E21F 17/107
                                                405/132
(Continued)

FOREIGN PATENT DOCUMENTS

DE         8805402 U1      7/1988
DE    202013103304 U1 *   11/2014
(Continued)

OTHER PUBLICATIONS

United Kingdom Patent Application No. GB1617611.7, Search Report dated Apr. 10, 2017, 3 pages.
(Continued)

*Primary Examiner* — Sunil Singh
(74) *Attorney, Agent, or Firm* — Kilpatrick Townsend & Stockton LLP

(57) ABSTRACT

The present invention relates to a sealing system, its uses and method of use for forming a seal against a surface, and in particular for plugging and sealing an orifice such as a road or railway tunnel to prevent or minimise the dispersion of hazardous agent(s) in an emergency scenario. The system comprises a frame (200) which can be orientated against a surface (50) of an orifice, frame (10) comprising a perimeter outer surface (180) through which pliant elements (40) can extrude, via apertures (22), following the initiation of a means (30) for providing an overpressure.

25 Claims, 4 Drawing Sheets

(51) Int. Cl.
  *B63B 81/00* (2020.01)
  *E21F 1/10* (2006.01)
  *E21F 1/14* (2006.01)
  *F16L 55/11* (2006.01)

(56) References Cited

U.S. PATENT DOCUMENTS

| | | | |
|---|---|---|---|
| 4,342,336 A | 8/1982 | Satterthwaite et al. | |
| 4,899,962 A | 2/1990 | Mueller | |
| 5,209,498 A | 5/1993 | Colin | |
| 2002/0113379 A1* | 8/2002 | Giebel | F16J 15/46 277/646 |
| 2008/0190032 A1 | 8/2008 | Roelofs | |
| 2014/0314490 A1 | 10/2014 | Bower et al. | |

FOREIGN PATENT DOCUMENTS

| | | | |
|---|---|---|---|
| EP | 0731245 A2 * | 9/1996 | |
| FR | 2301685 A1 | 9/1976 | |
| FR | 2301685 A * | 10/1976 | |
| GB | 420894 A * | 12/1934 | |
| JP | 3169940 U | 8/2011 | |
| WO | WO 92/01179 A1 * | 1/1992 | |
| WO | 9846859 A1 | 10/1998 | |
| WO | 2015189536 A1 | 12/2015 | |

OTHER PUBLICATIONS

International Patent Application No. PCT/GB2017/000153, International Search Report and Written Opinion dated Jan. 23, 2018, 14 pages.
United Kingdom Patent Application No. GB1717076.2, Combined Search and Examination Report dated Mar. 14, 2018, 6 pages.
International Patent Application No. PCT/GB2017/000153, International Preliminary Report on Patentability dated May 2, 2019, 8 pages.

* cited by examiner

Fig. 4A
Fig. 4B
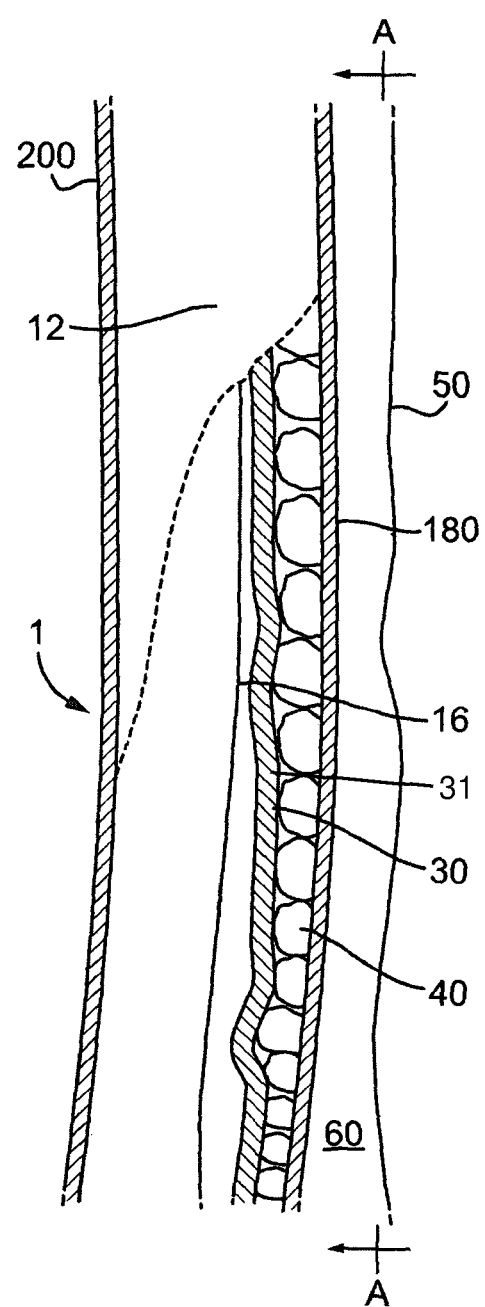
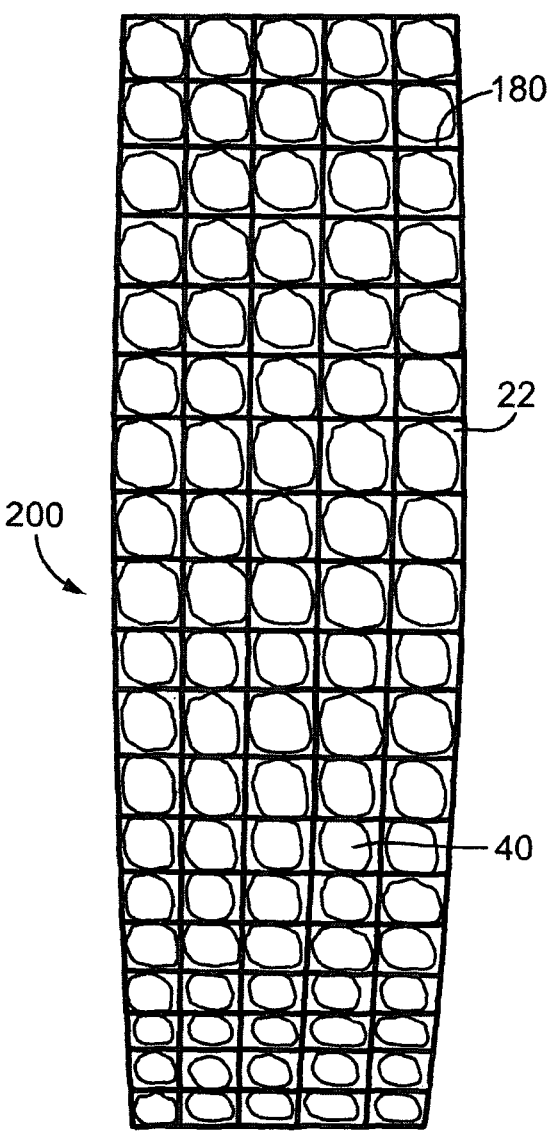

SEALING SYSTEM

TECHNICAL FIELD OF INVENTION

The present invention relates to a sealing system, its uses and a method of use, for forming a seal against a surface, in particular context for plugging and sealing an opening ('orifice'). The system provides a simple-to-operate device that is particularly suited for operations in confined spaces, including for plugging and sealing an orifice to a tunnel, to prevent or minimise the dispersion of a hazardous agent(s).

BACKGROUND TO THE INVENTION

The logistical problems posed by enclosed spaces, exemplified in particular by underground passages such as man-made tunnels, are not just limited to the engineering feats required to produce, maintain and further develop such environments. Undertaking emergency activities for temporarily plugging and sealing an orifice can be compromised as a result of operating in conditions which may require access to a remote location with limited and/or restrictive points of entrance, as well as being hampered by a lack of visibility, constricted manoeuvrability and an absence of specialist equipment available to responding personnel.

A particular problem with respect to enclosed spaces relates to mitigating the dispersal of a potentially hazardous substance, in the event of an accidental or intentional release of a material. Examples include the diffusion of toxic fumes in a passageway as a result of fire, and the distribution of a chemical, biological or radiological agent(s) as a result of a terrorist attack in an underground railway tunnel. Given the nature of such environments, the combination of confined space and circulating air can result in the rapid spread of an airborne hazard such as a toxic gas or aerosolised biological agent, posing a health risk to individuals as well a significant difficulty in terms of downstream clean-up/decontamination work. As an alternative to tunnel-based settings, the undesired entry of water into a ship, as a result of a breach of the ship exterior, is a further example of where a rapidly deployable response to seal an opening or passageway would be required.

Examples of existing plugging systems include the disclosure of US 2008/0190032 A1, describing an inflatable tunnel barrier adaptable to seal a mine tunnel via the side walls of the barrier in its inflated form. Although such apparatus can provide a seal in uniform spaces with smooth walls, a further complication encountered in environments such as tunnels, in particular railway tunnels, is the presence of protruding elements ('obstructions') such as railway tracks and pipes. These common obstructions can render inflatable barriers or plug ineffectual, as such apparatus cannot conform to the obstruction profile or obtain a seal against an obstructed surface.

Thus there is a need to develop a rapidly-deployable, easy-to-operate barrier arrangement capable of forming a seal against a surface, and especially in a confined space or within an opening, in particular a confined space displaying non-uniform surfaces. The present invention seeks to address these problems.

SUMMARY OF THE INVENTION

Accordingly, in the first aspect of the present invention there is provided a system for forming a seal against a surface, the system comprising a frame arranged to fit against the surface, the frame having a perimeter comprising at least one aperture; at least one pliant element housed adjacent to the perimeter of the frame; and a means for providing an overpressure to the at least one pliant element, such that in use initiating the means for providing an overpressure forces the at least one pliant element to extrude outwardly through the at least one aperture of the perimeter and mould to the surface to form a seal against the surface.

The perimeter of the frame typically refers to an outer region of the frame, in particular an outer region of the frame that has an edge, for example a planar edge, alignable with the surface to be sealed. Typically, the perimeter faces towards the surface to be sealed. In use, the frame can be aligned substantially perpendicular to the surface such that whole or part of the perimeter of the frame is aligned with the surface to be sealed. Such a configuration can be used to seal and plug an orifice (as discussed below in more detail). Alternatively, the frame can be parallel to a surface such that whole or part of the perimeter of the frame is aligned with the surface to be sealed. Such a configuration can be used to seal respirators against a human face.

In the present invention, at least one aperture is provided in the perimeter of the frame. The aperture in the perimeter is designed for the pliant element to be squeezed through as a result of initiating the means for providing an overpressure. Thus, in use, the at least one pliant element extrudes generally outward from the perimeter of the frame towards the surface.

The at least one pliant element is responsive to reshaping and easily manipulable following the application of a force to the pliant element by the means for providing an overpressure. This may be due to the characteristics of the material(s) defining the element. At least one pliant element is provided in the invention. Preferably, a plurality of pliant elements is provided. Individual pliant elements from a plurality of pliant elements may be associated with each of the at least one apertures. Alternatively, one pliant element may be associated with at least one aperture, in particular a plurality of apertures. Alternatively, there may be no particular association between the pliant element(s) and the aperture(s), for example a plurality of pliant elements may be packed into the frame in a loosely layered arrangement.

Thus, arranging the pliant element(s) next to the aperture(s) in the perimeter of the frame and applying an overpressure force to the pliant element(s) results in a portion of the pliant element(s) extruding or 'bubbling' through the aperture(s) in the frame. If a plurality of pliant elements is packed into the frame in a layered arrangement, it would be envisaged that an outer layer of pliant elements would extrude through the aperture(s) of the perimeter. When a plurality of pliant elements extrude through the aperture(s) of the perimeter, adjacent pliant elements reform against each other to produce convoluted air paths capable of providing an air-tight seal.

The Applicant has found that the system of the present invention offers the primary advantage of a system that is adaptable to form a seal against a wide variety of surfaces. The system is particularly advantageous for the formation of a temporary seal. Application of an overpressure to a pliant element(s), such that the pliant element(s) extrudes outwardly through the aperture(s) of the perimeter, offers a simple-yet-effective mouldable surface that can form a seal against the contours of a surface, including irregular surfaces with uneven undulations, rough texture or protruding obstacles. This is particularly true when a plurality of pliant elements is deployed, given the greater number of individual pliant elements that can extrude through the aperture(s) of the perimeter and mould to a surface to provide a seal.

The pliant element or plurality of pliant elements extrude independently through each aperture in response to the force applied by the means for providing an overpressure. As a result, individual pliant element(s) can react to the overpressure to different extents and hence, allow the elements to conform to the contours of the surface and each other.

The seal provided by the present invention is suitable for the formation of a wide range of seals. For example, application of the present invention can form a temporary seal against body parts, such as required for respirator seals against the human face. Alternatively, the present invention could be applied to form temporary seals for construction purposes, such as required by cofferdams when isolating a region of water.

The system of the invention may be configured to plug and seal an orifice.

In one embodiment, the frame itself acts as a physical barrier for plugging the orifice. In an alternative embodiment, the frame comprises an opening that provides access to the orifice and the system further comprises a means for providing a physical barrier within the frame, such that in use the means for providing a physical barrier allows for plugging of the orifice.

A system suitable for plugging and sealing an orifice may comprise a frame arranged to fit into the orifice, the frame having a perimeter comprising at least one aperture; a means for providing a physical barrier within the frame; at least one pliant element housed adjacent to the perimeter of the frame; and a means for providing an overpressure to the at least one pliant element, such that in use the means for providing a physical barrier allows for plugging of the orifice and initiating the means for providing an overpressure forces the at least one pliant element to extrude outwardly through the at least one aperture of the perimeter to seal the orifice.

The orifice may be an opening, or any other cross-section, of a tunnel or other confined space. However, the system of the invention may be adapted to plug and seal a wide variety of other orifices. The system is particularly advantageous for the formation of a temporary sealed barrier in an orifice.

The means for providing a physical barrier may be integral to the frame. This feature provides the advantage of easily establishing a barrier which plugs the majority of an orifice, with the seal being formed upon the pliant element(s) moulding to the orifice surface to provide a seal.

The means for providing a physical barrier may be an attachment means. The attachment means may be a hook-and-eye arrangement, rope/string, or other suitable means provided on the frame from which a physical barrier could be attached to the frame. This feature provides an advantage of a frame that can be arranged to lack a physical barrier, such that the orifice is accessible when the physical barrier is not deployed to provide a plug. Furthermore, the physical barrier can be deployed simply by attaching a physical barrier to the frame via the attachment means to plug the orifice, wherein the seal is formed upon moulding the pliant element(s) to the orifice surface.

The means for providing a physical barrier may be an inflatable element. This feature provides a more lightweight, easily assembled structure, relative to the frame, which can be rapidly inflated for deployment or deflated for efficient storage purposes. Furthermore, the inflatable element in an inflated state could additionally function as the means for providing an overpressure to the pliant element(s), forcing the pliant element(s) to extrude outwardly through the aperture(s) of the perimeter and mould to the orifice surface to provide a seal.

The means for providing an overpressure may be an inflatable element, and preferably both the means for providing the physical barrier, in the case of a system for plugging and sealing an orifice, and the means for providing an overpressure, is an inflatable element. The means for providing a physical barrier and the means for providing an overpressure may be the same inflatable element. The means for providing an overpressure may be initiated via an air pump, for example the means for providing an overpressure may be an inflatable element comprising an air pump. These features provide a simple, repeatable, rapid and quantifiable means for providing an overpressure which assists in forming a seal. Furthermore, the overpressure can be removed, such as by returning the means for providing an overpressure to its original size, for example via deflation in the case of an air-pressure-based means of initiation, thus providing for a re-deployable system which can be operated when required and disengaged upon completion of the activity in question. Where the means for providing a physical barrier is an inflatable element, an air pump can be used to inflate the physical barrier.

In the system of the present invention, the frame may be substantially rigid. This provides the advantage of a solid structure which is capable of housing the means for providing the overpressure and the pliant element(s), such that the means for providing an overpressure does not distort the frame when the overpressure is initiated. Furthermore, a substantially rigid frame ensures that the pliant element(s) is reshaped to extrude through the aperture(s) of the frame perimeter as the result of the overpressure being applied, enabling the pliant element(s) to mould to the orifice surface to provide a seal.

The frame may comprise metal or an alloy. Any suitable metal or alloy may be chosen but preferably, the metal or alloy is steel. These features provide the advantage of ensuring the frame can be manufactured using a material that has favourable characteristics including ready availability, ease of manufacture into the desired frame shape using established techniques, and attractive properties in terms of strength, rigidity and durability.

The frame may be any suitable shape, the shape being selected for a particular application. The frame may be annular or partly annular, which may be particularly suitable where the system is configured to plug and seal an orifice. If the orifice to be plugged and sealed is not circular or substantially circular, the frame may take a different shape, for example a rectangle, square or arch. This feature, with particular reference to a system for plugging and sealing an orifice, provides the advantage of a frame that conforms to the shape of the types of orifice for which use of the system can be envisaged, for example roads and railway tunnels in particular. In an application such as forming a respirator seal, the frame may take a non-uniform shape, for example the shape of a respirator's oro-nasal cavity.

The at least one aperture in the perimeter may be any suitable shape, for example squares, circles, rectangle or hexagons. The size and shape of the aperture(s) may be selected so as to restrict movement of pliant element(s) through the aperture(s). This feature provides the advantage of making it easier to determine a size of aperture which would restrict passage of a pliant element(s) though the aperture(s), following the application of an overpressure, such that a portion of pliant element(s) is retained within the frame while a remaining portion extrudes through the aperture(s) in the frame.

In the invention, the perimeter comprises at least one aperture. Preferably, the perimeter comprises a plurality of apertures. More preferably, the perimeter comprises a plurality of apertures that are spaced around the perimeter and even more preferably, the perimeter comprises a plurality of apertures that are uniformly spaced around the perimeter. The plurality of apertures may be uniformly arranged in the perimeter to provide a mesh. This feature provides the advantage of a consistent sealing against the surface. The density of apertures in the mesh may be selected to provide, for a particular application, optimum spacing between the pliant elements and hence, optimum sealing properties.

The at least one pliant element may be an elastomeric vessel containing a liquid or gel. For example, the at least one pliant element may be a gel pack or a plurality of gel packs. The at least one pliant element may comprise any suitable liquid or gel, for example polyvinyl alcohol. The at least one pliant element may comprise any suitable elastomer, for example the pliant element may be a polybutadiene vessel or may comprise natural rubber or butyl rubber. Elastomeric materials are polymers with viscoelasticity, thus they are viscous and elastic, which is advantageous for the present invention since they provide for a pliant element(s) that is mouldable to seal against uneven surfaces, or around obstructions. They also have the ability to reform against each other to produce convoluted air paths capable of providing an air-tight seal, for example against a surface. Furthermore, removal of an overpressure can result in the elastomeric material of the pliant element(s) returning to their original form, which is desirable in terms of a system which can be rapidly deployed or disengaged.

In a second aspect of the present invention, there is provided use of a system as described above as a barrier. Preferably, the barrier is to mitigate the dispersion of a hazardous agent. Further preferably, the hazardous agent is a chemical hazard, including a toxic industrial chemical hazard, or biological hazard. In such a scenario, it could be envisaged that one system could be deployed to prevent dispersal of a hazardous agent in a particular direction. Alternatively, more than one system could be provided and deployed at the same or similar time to ensure a released hazardous agent is more fully contained between multiple sealing systems.

In a further embodiment of the second aspect of the present invention, there is provided use of a system for plugging and sealing tunnels. Preferably, the tunnels are railway tunnels.

In a further embodiment of the second aspect of the present invention, there is provided use of a system for plugging and sealing an orifice; such as a leak, in boats.

Preferably, there is provided use of a system for providing a temporary seal between two compartments of a vehicle or form of transport, in particular hold compartments of an aircraft.

It will be understood that the plural term for any structure intended to be plugged and sealed e.g. 'tunnels' can be interchanged with the singular i.e. tunnel.

In a third aspect of the present invention, there is provided a method for forming a seal against a surface comprising the steps of placing the system as described above against a surface; and initiating the means for providing an overpressure to force the at least one pliant element to extrude outwardly through the at least one aperture of the perimeter and mould to the surface to form a seal against the surface.

In an embodiment of the third aspect of the present invention there is provided a method for plugging and sealing an orifice comprising the steps of placing the system as described above within an orifice; if required, providing the physical barrier within the frame to plug the orifice; and initiating the means for providing an over-pressure to force the at least one pliant element to extrude outwardly through the at least one aperture of the perimeter and mould to the surface defining the orifice to seal the orifice.

Any feature in one aspect of the invention may be applied to any other aspects of the invention, in any appropriate combination. In particular system aspects may be applied to method and use aspects and vice versa. The invention extends to a system, use or method substantially as herein described, with reference to the accompanying drawings.

BRIEF DESCRIPTION OF THE DRAWINGS

The present invention will now be described, with reference to the following non-limiting examples and figures in which:

FIG. 4a shows a part-cutaway side view of a section of an embodiment of the present invitation wherein the means for providing an overpressure is in an uninitiated state;

FIG. 4b shows a side view along the line A-A of FIG. 4a;

FIG. 5b shows a side view along the line A-A' of FIG. 5a.

In the figures, like parts are denoted by like reference numbers.

The drawings are for illustrative purposes only and are not to scale.

DETAILED DESCRIPTION

Figure 1:
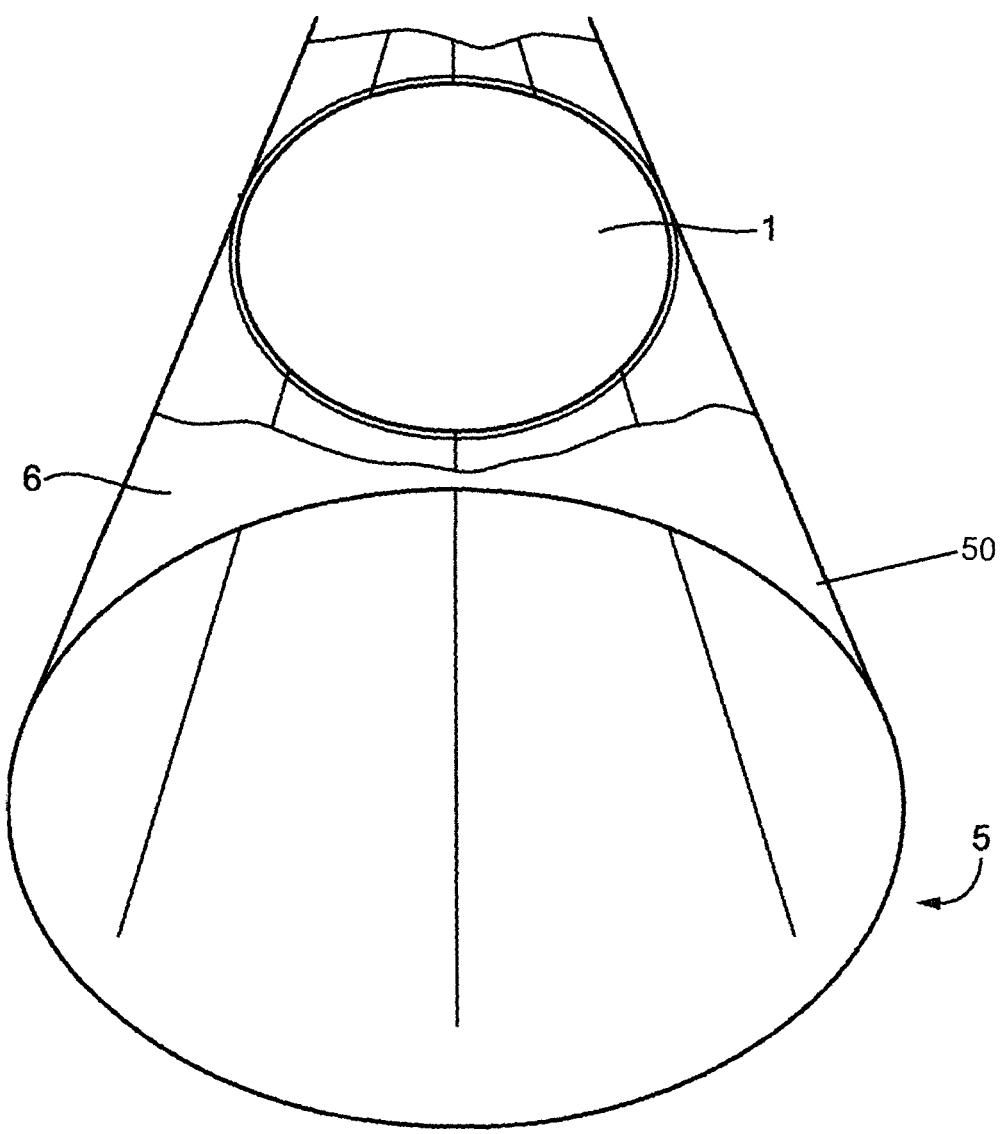
FIG. 1 shows a part-cutaway view of a system for plugging and sealing an orifice in accordance with the present invention.

FIG. 1 shows a system 1 for plugging and sealing an orifice 5 by forming a barrier in a tunnel 6 against orifice surface 50.

Figure 2:
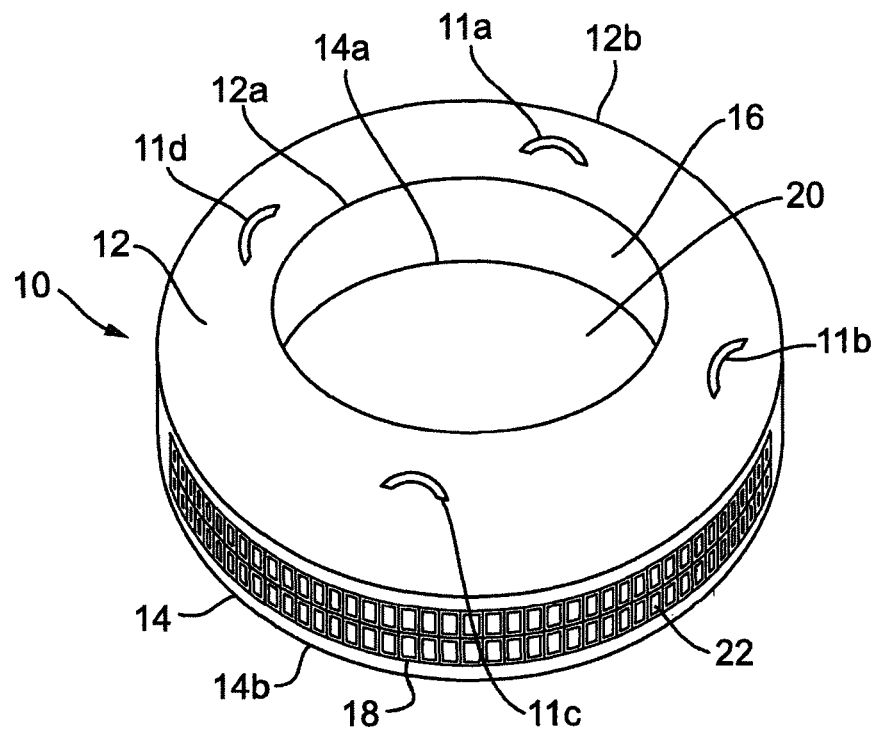
FIG. 2 shows a perspective view of an embodiment of a frame in accordance with the present invention.

FIG. 2 shows a hollow frame 10 for a system 1 for plugging and sealing an orifice. The frame 10 includes aligned, O-shaped planar surfaces 12, 14, with inner edges 12a, 14a and outer edges 12b, 14b. O-shaped planar surfaces 12, 14 are arranged perpendicular to the frame perimeter inner surface 16 and frame perimeter outer surface 18 respectively and contribute to the structural integrity of the frame 10. Furthermore, the O-shaped planar surfaces 12, 14 help define a central opening 20 which provides access to the orifice, for example when the system 1 is in an uninitiated state. A physical barrier can be attached to the frame 10 to provide a plug, for example via an attachment means 11a-d present on the frame. Frame perimeter inner surface 16 provides further structural support to the frame 10 and offers a surface against which a means 30 (see FIGS. 4a and 5a) for providing an overpressure can abut when the means 30 is in an initiated (i.e. inflated) state. The frame perimeter outer surface 18 is defined by a mesh-like surface comprising a series of 10 mm square apertures 22. In this embodiment, frame 10 comprises two rows of 10 mm square apertures 22.

Figure 3:
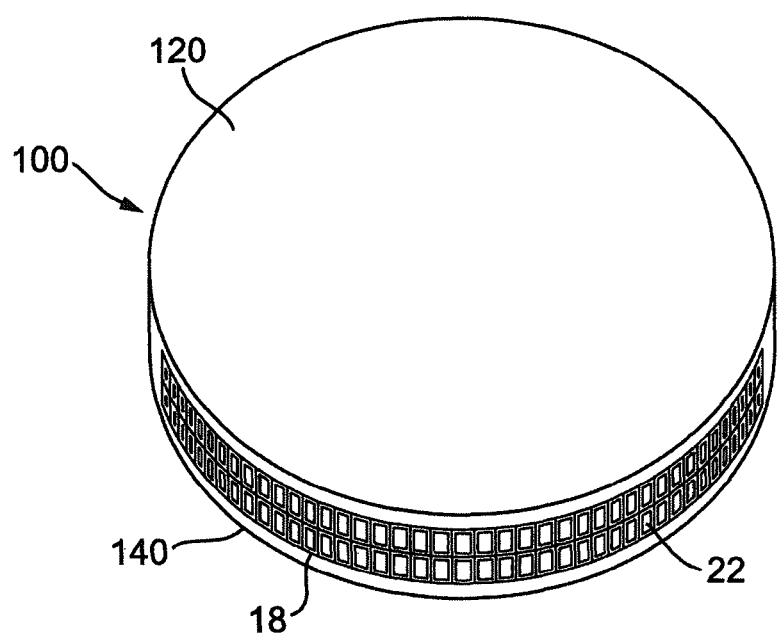
FIG. 3 shows a perspective view of a further embodiment of a frame in accordance with the present invention.

FIG. 3 shows a frame 100 for a system 1 for plugging and sealing an orifice; The frame 100 includes aligned, planar surfaces 120, 140 arranged perpendicular to frame perimeter outer surface 18. Planar surfaces 120, 140 contribute to the structural integrity of the frame 100 as well as providing a physical barrier such that the frame 100 can provide a plug within an orifice. The frame perimeter outer surface 18 is defined by a mesh-like surface comprising a series of 10 mm square apertures 22. Frame 100 includes a frame perimeter inner surface 16 (not shown), similar to the frame of FIG. 2, which offers a surface against which a means 30 (see FIGS. 4a and 5a) for providing an overpressure can abut when the means 30 is in an initiated (i.e. inflated) state.

FIG. 4a shows system 1 for providing a seal against an orifice surface 50, comprising frame 200 orientated such that planar surfaces 12, 14 (planar surface 14 not shown) are oriented perpendicular to surface 50 and, accordingly, the frame perimeter outer surface 180 is aligned adjacent to, but not touching, surface 50. In this embodiment, frame perimeter outer surface 180 of frame 200 comprises five rows of 10 mm apertures 22 (not shown). As shown in the part-cutaway side view depicting the interior of frame 200, frame perimeter inner surface 16 is located at a distance further away from orifice surface 50, relative to the frame perimeter outer surface 180. In between the frame perimeter inner surface 16 and the frame perimeter outer surface 180 is rubber tyre 31 in an initiated (i.e. uninflated) state and pliant gel packs 40, the latter arranged between the rubber tyre 31 and the frame perimeter outer surface 180. Due to the uninitiated state of the rubber tyre 31, the pliant gel packs 40 remain fully within, or at least predominantly within, the confines of the perimeter frame outer surface 180. As a result, gap 60 exists between the frame perimeter outer surface 180 and surface 50 and a seal is not formed between the system 1 and the orifice surface 50.

FIG. 4b shows the resultant orthogonal side view appearance of frame 200 and pliant gel packs 40 when the rubber tyre 31 (not shown) is in an uninitiated state, viewed when facing frame perimeter outer surface 180. Given the uninitiated state of the rubber tyre 31, 10 mm apertures 22 are visible in the frame perimeter outer surface 180.

Figure 5A:
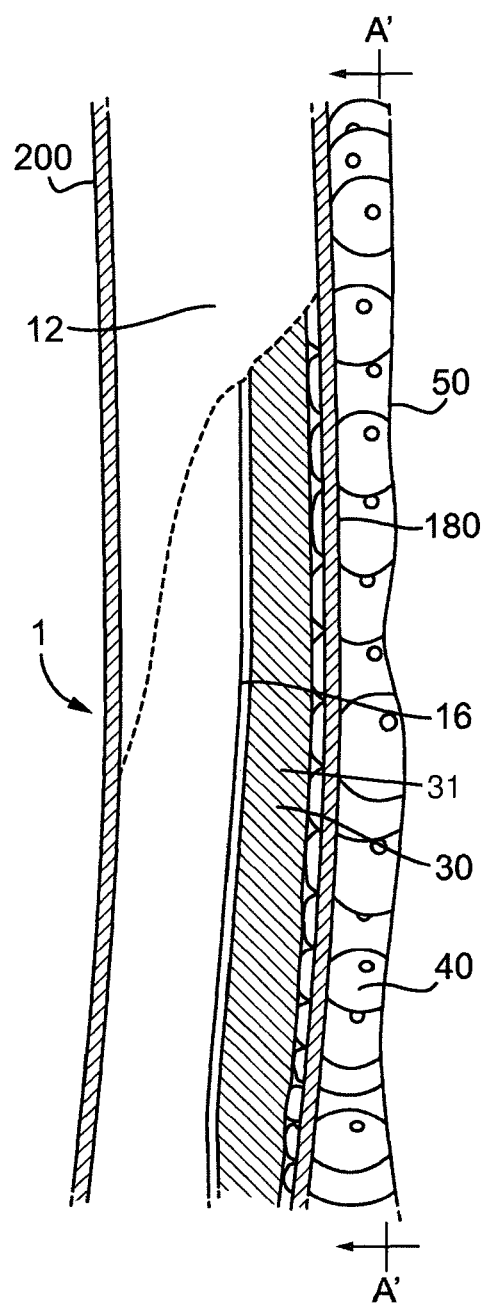
FIG. 5a shows a part-cutaway side view of a section of an embodiment of the present invention wherein the means for providing an overpressure is in an initiated state.

FIG. 5a shows system 1 in use for providing a seal against an orifice surface 50. Within frame 200, rubber tyre 31 is inflated to a pressure of 70 kPa, using an air pump (not shown) set at an airflow rate of 20 l/min. Due to the initiated state of the rubber tyre 31, the resultant overpressure forces pliant gel packs 40 to extrude outwardly from the confines of the perimeter frame outer surface 180 through the 10 mm apertures 22, with a force of 1600 Pa exerted between adjacent pliant gel packs 40 (as measured with a digital manometer). As a result of pliant gel packs 40 extruding through 10 mm apertures 22, a seal is formed between the system 1 and the orifice surface 50.

Figure 5B:
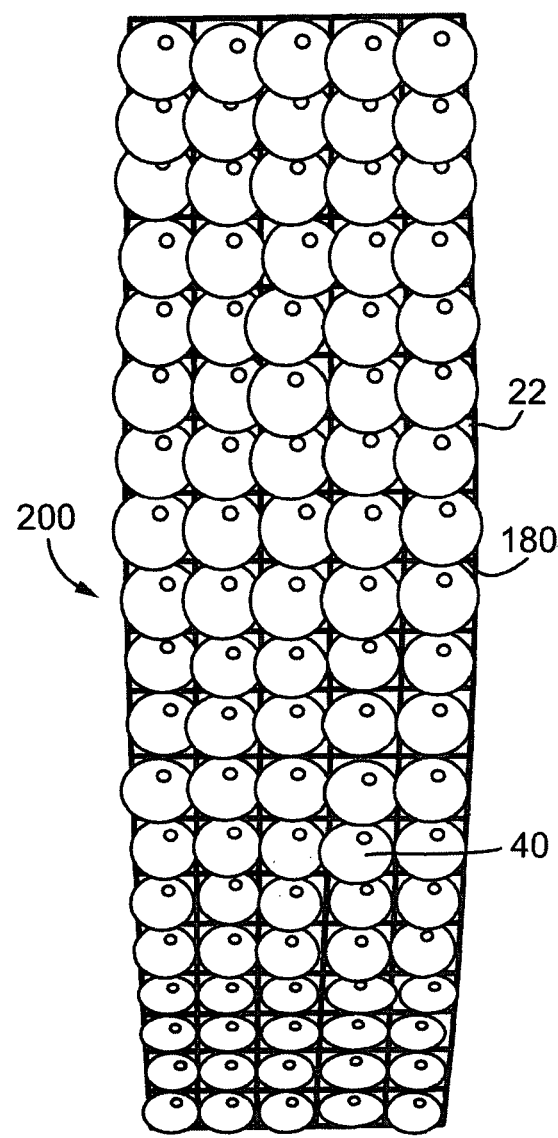

FIG. 5b shows the resultant orthogonal appearance of frame 200 and extruding pliant gel packs 40 through 10 mm apertures 22 when the rubber tyre 31 (not shown) is in an initiated state, viewed when facing frame perimeter outer surface 180.

Various modifications to the system 1 can be made as will be apparent to those skilled in the art. For example, Frame 10, 100, 200 can be a variety of shapes to ensure the frame fits a given orifice. Furthermore, planar surfaces 12, 14, 120, 140 can be flush with respect to the frame perimeter inner surface 16 and frame perimeter outer surface 18, 180 respectively, or offset in terms of angle and/or alignment with one of/each frame perimeter surface edge 16, 18, 180. One of planar surface 120, 140 may be used in the system 1 to provide a physical barrier, while the corresponding aligned planar surface 14, 12 provides an O-shaped planar surface. The mesh arrangement can be varied as desired by the skilled person, for example with respect to: the location and size of apertures 22 (for example the arrangement of aperture(s) at the perimeter and, with respect to size, the apertures being less than 10 mm, less than 20 mm, less than, equal to or greater than 30 mm); the shape of apertures 22 (for example round holes, elongated slots, a variety of aperture shapes for each frame 10, 100, 200); and the number of apertures 22 (for example due to a variation in the number of aperture rows or as a result of the size of each aperture). While the frame 10, 100, 200 can be circular, the frame can comprise a planar region on the frame perimeter outer surface 18, 180 such that the corresponding region of the frame can align with a level surface such as a road or railway track. Although the pliant element(s) i.e. gel packs 40 can be in an unrestrained arrangement within the frame 10, 100, 200 other arrangements are envisaged. For example, a plurality of gel packs 40 can be restrained within mesh bags, in order to assist with maintaining these elements within the frame 10, 100, 200. Alternatively, a pliant element(s) i.e. gel packs 40 can be arranged such that upon initiation of the means for providing an overpressure, an inflatable element attached to the frame 10, 200 via an attachment means is inflated and gel packs 40 are forced to extrude from the aperture(s) 22 of the frame perimeter outer surface 18, 180 to mould to the surface of an orifice. As a result, the orifice is plugged and sealed. Alternatively, pliant element(s) i.e. gel packs 40 could be mounted on the exterior of an inflatable element in order to achieve the same desired effect in terms of plugging and sealing an orifice. Although it is envisaged that in the case of a system 1 with multiple pliant elements i.e. gel packs 40 and apertures 22, the ratio of pliant element extruding through aperture would be 1:1. However, depending on the size of the pliant element(s) and apertures(s) other ratios may be envisaged. Initiating the means 30 for providing an overpressure could be achieved by via explosive inflation or, alternatively, by mechanical, pneumatic or hydraulic means, or further alternatively via the use of smart materials wherein the properties of the material change upon application of an electrical stimulus. Alternative pliant element materials are envisaged as would be understood by the skilled person, for example a pliant element comprising butyl rubber or a formation thereof.

It will be understood that the present invention has been described above purely by way of example, and modification of detail can be made within the scope of the invention. Each feature disclosed in the description, and (where appropriate) the claims and drawings may be provided independently or in any appropriate combination.

Moreover, the invention has been described with specific reference to a system suitable for plugging and sealing orifices such as tunnels. It will be understood that this is not intended to be limiting and the invention may be used more generally. For example, the invention may be used more generally in the civilian and military fields for applications that require seals to be formed between a device or object and a surface, such as plugging and sealing between sections of any appropriate structure that may require plugging and sealing. Additional applications of the invention will occur to the skilled person.

The invention claimed is:

1. A system for forming a seal against a surface, the system comprising:
   a frame arranged to fit against the surface, the frame having a perimeter comprising a plurality of apertures uniformly spaced around the perimeter;
   at least one pliant element housed adjacent to the perimeter of the frame; and a means for providing an overpressure to the at least one pliant element, wherein, when initiated, the means for providing an overpressure is configured to force the at least one pliant element to extrude outwardly through the plurality of apertures of the perimeter and mould to the surface to form a seal against the surface.

2. A system according to claim 1, wherein the system is configured to plug and seal an orifice.

3. A system according to claim 2, wherein the frame itself acts as a physical barrier for plugging the orifice.

4. A system according to claim 2, wherein the frame comprises an opening that provides access to the orifice and wherein the system further comprises a means for providing a physical barrier within the frame, wherein the means for providing Hall the physical barrier is configured to allow for plugging of the orifice.

5. A system according to claim 4, wherein the means for providing the physical barrier is integral to the frame.

6. A system according to claim 4, wherein the means for providing the physical barrier is an attachment means.

7. A system according to claim 4, wherein the means for providing the physical barrier is an inflatable element.

8. A system according to claim 7, wherein the means for providing the overpressure is an inflatable element.

9. A system according to claim 8, wherein the means for providing the physical barrier and the means for providing the overpressure are the same inflatable element.

10. A system according to claim 2, wherein the system is configured to plug and seal a tunnel.

11. A system according to claim 10, wherein the tunnel is a railway tunnel.

12. A system according to claim 2, wherein the system is configured to plug and seal leaks in boats.

13. A system according to claim 2, wherein the system is configured to plug and seal hold compartments of an aircraft.

14. A system according to claim 1, wherein the frame is substantially rigid.

15. A system according to claim 1, wherein the frame is annular or partly annular.

16. A system according to claim 1, wherein the plurality of apertures in the perimeter are square-shaped.

17. A system according to claim 1, wherein the means for providing the overpressure comprises an air pump.

18. A system according to claim 1 wherein the at least one pliant element is an elastomeric vessel containing a liquid or gel.

19. A system according to claim 18, wherein the at least one pliant element comprises polyvinyl alcohol.

20. A system according to claim 18, wherein the at least one pliant element comprises a polybutadiene vessel.

21. A system according to claim 1, wherein the system is a barrier.

22. A system according to claim 21, wherein the barrier is configured to mitigate dispersion of a hazardous agent.

23. A system according to claim 22, wherein the hazardous agent is a chemical or biological hazard.

24. A method for forming the seal against the surface comprising the steps of:
    placing the system of claim 1 against the surface; and
    initiating the means for providing the overpressure to force the at least one pliant element to extrude outwardly through the plurality of apertures of the perimeter and mould to the surface to form the seal against the surface.

25. A method for plugging and sealing the orifice comprising the steps of:
    placing the system of claim 2 within the orifice; and
    initiating the means for providing the overpressure to force the at least one pliant element to extrude outwardly through the plurality of apertures of the perimeter and mould to the surface defining the orifice to seal the orifice.

* * * * *

UNITED STATES PATENT AND TRADEMARK OFFICE
CERTIFICATE OF CORRECTION

| | |
|---|---|
| PATENT NO. | : 11,293,285 B2 |
| APPLICATION NO. | : 16/341170 |
| DATED | : April 5, 2022 |
| INVENTOR(S) | : Thompson et al. |

It is certified that error appears in the above-identified patent and that said Letters Patent is hereby corrected as shown below:

In the Claims

Column 9, Line 15, replace "providing Hall the physical barrier is configured to allow for" with -- providing the physical barrier is configured to allow for --

Signed and Sealed this
Fifth Day of September, 2023

Katherine Kelly Vidal
*Director of the United States Patent and Trademark Office*